Jan. 9, 1940.  P. STOJANECK  2,186,351
SEMIARTIFICIAL CHRISTMAS TREE
Filed Sept. 12, 1938
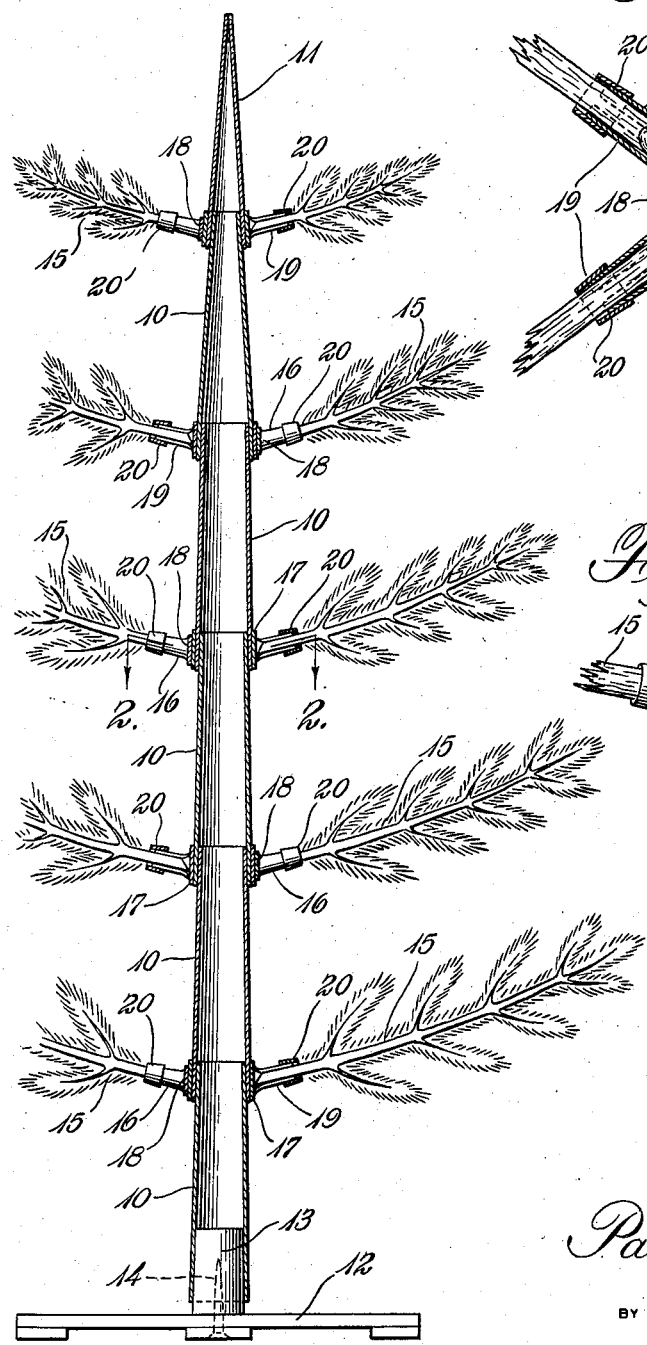
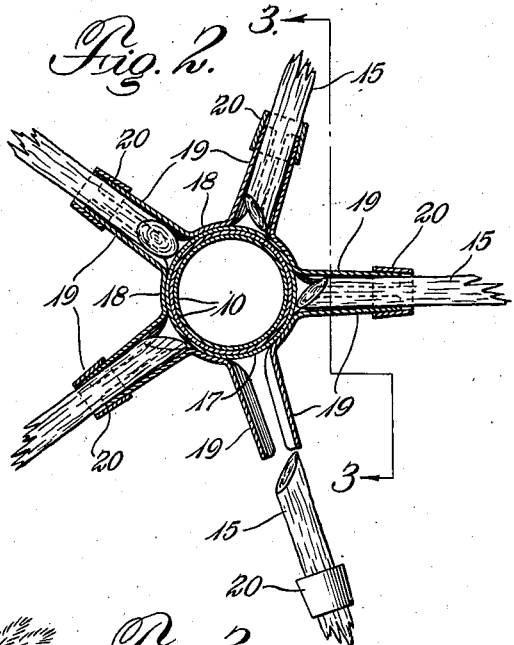
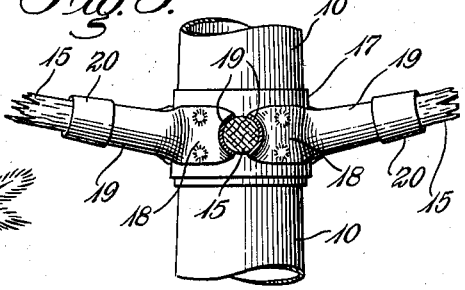
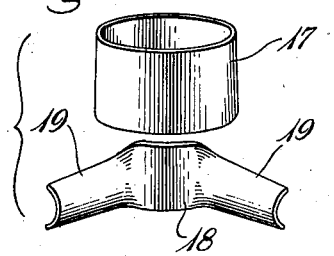
Paul Stojaneck.
INVENTOR
BY Victor J. Evans & Co.
ATTORNEYS Patented Jan. 9, 1940

2,186,351

UNITED STATES PATENT OFFICE 2,186,351

SEMIARTIFICIAL CHRISTMAS TREE

Paul Stojaneck, Detroit, Mich.

Application September 12, 1938, Serial No. 229,597

2 Claims. (Cl. 41—15)

This invention relates to a semiartificial Christmas tree and has for an object to provide a telescopic metal trunk having sockets to receive natural branches from live trees such as fir, or pine, and thus avoid the necessity of cutting down the entire tree to provide a Christmas tree.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view of a semiartificial Christmas tree constructed in accordance with the invention.

Figure 2 is an enlarged cross sectional view taken on the line 2—2 of Figure 1.

Figure 3 is a detail cross sectional view taken on the line 3—3 of Figure 2.

Figure 4 is an exploded perspective view showing the construction of the sockets.

Referring now to the drawing in which like characters of reference designate similar parts in the various views, 10 designates a plurality of tapered tubular sections which form the trunk of the tree and which diminish in size toward the top which is provided with a conical cap 11. The trunk thus formed is secured to a conventional cruciform base 12, there being a plug 13 attached to the base through the medium of a screw 14 and inserted in the lowermost section of the trunk to secure the trunk to the base.

The branches 15 of the tree are taken from live trees, such as fir or pine, and are secured to the trunk through the medium of a plurality of relatively short tubular socket members 16 which project from the trunk in a plurality of annular series at spaced intervals.

Each socket member comprises a ring 17, best shown in Figure 4, having formed thereon or secured thereto by welding or otherwise, a plurality of brackets 18, arcuate in shape, provided at the ends with radially extending half tubular arms 19, two of such arms being mounted together, as best shown in Figures 2 and 3, to form full circles or tubular socket members for receiving the live tree branches.

The rings 17 are spaced apart at substantially regular intervals on the tubular sections 10 to support the natural tree branches 15 in the simulation of a Christmas tree.

For removably securing the natural branches to the socket members clamp ferrules 20 are slipped over the ends of the two arms 19 forming a single socket member and compress the arms together into clamping engagement with the trimmed end of the natural branch.

From the above description it is thought that the construction and operation of the invention will be fully understood without further explanation.

What is claimed is:

1. Artificial tree structure comprising an upright member forming the trunk of the tree, a base secured to the member, a plurality of socket members on the upright member for receiving branches taken from live trees, said socket members each being formed of a bracket having radially extending semitubular arms two of said arms being mounted together to form substantially tubular holders for receiving the live tree branches, and ferrules on the ends of each two arms forming a single socket member adapted to compress said arms together for clamping engagement with the tree branches.

2. Artificial tree structure comprising an upright member formed of tapered sections telescopically assembled to form the trunk of the tree, a base secured to the lowermost section, rings encircling respective sections at the lower ends of the sections, a plurality of socket members carried by the rings for receiving branches taken from live trees, said socket members being each formed of an arcuate bracket secured to the respective ring and having terminal radially extending semitubular arms, two of said arms being mounted together to form substantially tubular holders for receiving the live tree branches, and ferrules on the ends of each two arms forming a single socket member adapted to compress said arms together for clamping engagement with the tree branches.

PAUL STOJANECK.